United States Patent [19]

Akamatsu et al.

[11] 3,952,418

[45] Apr. 27, 1976

[54] MASTER GEAR FOR CHECKING TOOTH CONTACT

[75] Inventors: Toshiaki Akamatsu, Okazaki; Masahiko Yasugi; Mitsuyuki Bito, both of Toyota, all of Japan

[73] Assignee: Toyota Jidosha Kogyo Kabushiki Kaisha, Toyota, Japan

[22] Filed: Jan. 30, 1975

[21] Appl. No.: 545,632

[30] Foreign Application Priority Data

Sept. 21, 1974 Japan.................... 49-114681[U]

[52] U.S. Cl. ................ 33/174 L; 33/179.5 R; 73/162; 324/71 R; 340/265
[51] Int. Cl.² ................ G01B 7/28; G01M 13/02
[58] Field of Search............ 73/162, 105; 33/174 L, 33/174 P, 179.5 R, 179.5 B, 179.5 C, 179.5 E; 340/265; 324/71 R, 71 E

[56] References Cited

UNITED STATES PATENTS

| 1,766,991 | 6/1930 | Gardner................. 340/265 UX |
| 2,332,983 | 10/1943 | Björkbom.................. 33/174 L |
| 2,569,433 | 9/1951 | Highberg et al............. 33/174 L |
| 3,263,163 | 7/1966 | Foster et al................ 73/162 X |
| 3,563,666 | 2/1971 | Foster...................... 73/162 X |

Primary Examiner—Richard C. Queisser
Assistant Examiner—Frederick Shoon
Attorney, Agent, or Firm—Brisebois & Kruger

[57] ABSTRACT

Master gear for checking tooth contact characterized by the fact that all or part of its contact surface is made of an insulating material and two sets of conductive detectors are regularly arranged on said tooth contact surface one of which extends parallel to and the other perpendicular to the flat sides of the tooth.

5 Claims, 10 Drawing Figures

MASTER GEAR FOR CHECKING TOOTH CONTACT

BACKGROUND OF THE INVENTION

The conventional terminal gear for checking tooth contact in which a conductive material and an insulating material are laminated parallel to the flat sides of the tooth, is capable of checking the tooth contact in one direction, but unable to do so in a direction perpendicular thereto. Moreover, in the case of a conventional laminated master gear in which the distance between the conductive laminations must be at least 1 mm on account of the technical limitations for alternately laminating the metal conductor and insulating material, it is difficult to make an inspection of the tooth contact even in said one direction with sufficient precision. Furthermore, a conventional laminated master gear, which is usually insulated with resin, is subject to a considerable drop in the precision of checking due to the thermal expansion or thermal deformation of the resin used and it has been necessary to use the gear at a controlled temperature. For these reasons a conventional master gear for checking tooth contact is unsatisfactory for the mass-production of gears with high dimensional precision. Thus there has been a strong demand for the development of a master gear for checking tooth contact which can check the tooth contact both in a direction parallel to the flat side of the tooth and one perpendicular thereto at the same time, which can carry out the checking with higher precision, and can be unaffected by the temperature of the surroundings in which it is used.

SUMMARY OF THE INVENTION

The principal object of the present invention is to provide a master gear for checking tooth contact which can check the tooth contact in a direction parallel to and in a direction perpendicular to the flat side of the tooth simultaneously and with high precision without the aid of pulse control by a minicomputer or the like. The master gear for checking tooth contact according to the present invention permits the mass-production of gears with uniform dimensional precision in both of these directions.

Other objects of the present invention will become apparent from the following description of preferred embodiments of the present invention.

DETAILED DESCRIPTION OF THE INVENTION

Before describing the master gear according to the invention, a conventional master gear and its working principle will be explained in detail with reference to the attached drawings.

In the conventional method of checking the gear tooth contact, a laminated master gear with a contacting part comprising alternate layers of metallic conductor and of an insulator has been employed.

Figure 1:
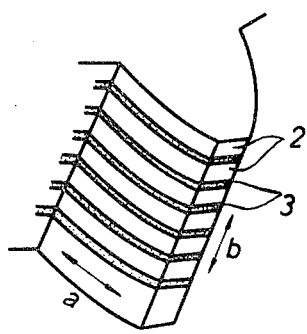
FIG. 1 is a schematic enlarged view of the tooth contact surface in a conventional laminated master gear for the checking of tooth contact.
Figure 10:
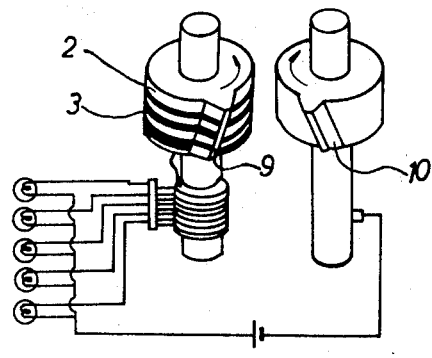
FIG. 10 is a diagram illustrating the principle of checking the tooth contact.

As indicated in FIG. 1, the parts 2 in this conventional laminated master gear are conductive layers, while the parts 3 which alternate with said conductive layers are insulating layers for insulating the conductive layers when a voltage is applied to said master gear. The conductors 2 are connected to a connector (not shown), which in turn is connected to the detector in the gear tooth contact checking system. To explain the working principle by referring to FIG. 10, when the tooth of a master gear 9 carrying an electrical charge comes into contact with the tooth of a gear 10 to be checked for tooth contact, a current passes between them. As a result, an electric signal is generated at the terminal of the connector attached to the master gear and this signal is transmitted through the connector to the detector in the tooth contact selection system, so the tooth contact of the test gear is detected. This is the working principle of a conventional laminated master gear for the checking of tooth contact.

As will be understood from the above description and from FIG. 1, since the contact-checking terminal gear of a conventional laminated master gear is made of an assembly of conductors and insulators with laminations parallel to the flat side of the tooth, (i.e., stacked in the direction $b$ in FIG. 1), it may be possible to inspect the tooth contact in the direction $b$, but impossible to check the tooth contact in a direction perpendicular thereto, (in the direction $a$ in FIG. 1).

Figure 2:
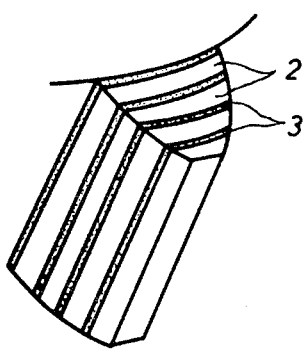
FIG. 2 is a schematic enlarged view of the tooth contact surface in a master gear for checking tooth contact in the direction of tooth trace.

And if the master gear is made of conductors 2 and insulators 3 laminated as shown in FIG. 2, it is impossible to check the tooth contact in the direction $b$.

The present invention has been developed in order to eliminate the above drawback of conventional master gears for checking tooth contact, and the structure of its contacting part is made up of an insulating material, on the surface of which are regularly arranged a plurality of conductive detectors in both directions $a$ and $b$.

Some embodiments of the present invention will now be described with reference to the accompanying drawings.

Figure 3:
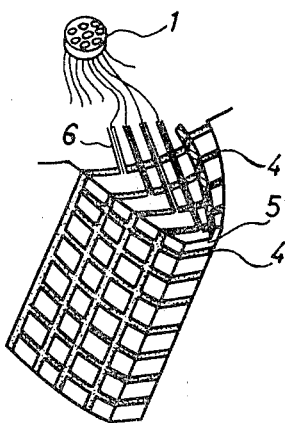
FIGS. 3, 4, 6 and 7 are schematic enlarged views of the tooth contact surface in the master gear for checking tooth contact according to the present invention.

In the embodiment illustrated in FIG. 3, the surface of the terminal tooth for checking tooth contact is provided with a grid-like insulating layer 4 such that the exposed areas may constitute an array of square conductive detectors 5 in both directions $a$ and $b$. The conductive detectors 5 are connected via conductive pieces or wire 6 to the connector 1 which transmits the electric signal. If the insulation 4 is made of a material with nearly the same coefficient of thermal expansion as steel, this will be advantageous, because the mesurement of a steel gear then requires no temperature control. Such a material is, for instance, the ceramic "forsterite" ($2Mg.SiO_2$), having a coefficient of thermal expansion of $10.6 \times 10^{-6}$/deg.

Figure 4:
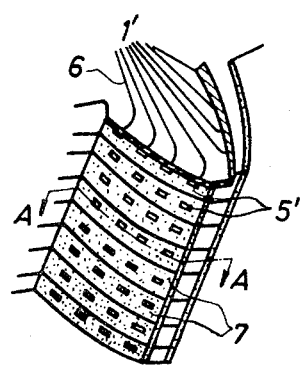
Figure 5:
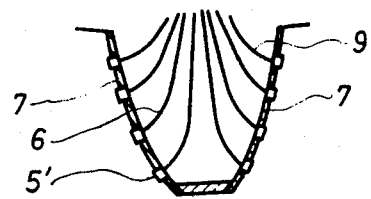
FIG. 5 is a sectional view taken along the line A—A of FIG. 4.

In another embodiment illustrated in FIGS. 4 and 5, a conductive pattern is printed on the surface of a thin ceramic tape. Such tapes are sintered together in several layers, producing a narrow ceramic laminated sheet 7, to which conductive wires 6 are connected to form a conductive pattern. Then a plurality of rectangular conductive detectors 5' are brazed to the laminated sheet 7 in such a way that the conductive wires come into contact with said detectors. A plurality of such narrow laminated sheets 7 are bonded to the gear surface, as shown in FIG. 4 and after tooth form grinding, a laminated gear is produced. In the laminated master gear thus produced the rectangular conductive detectors 5' are spaced in both directions $a$ and $b$.

Figure 6:
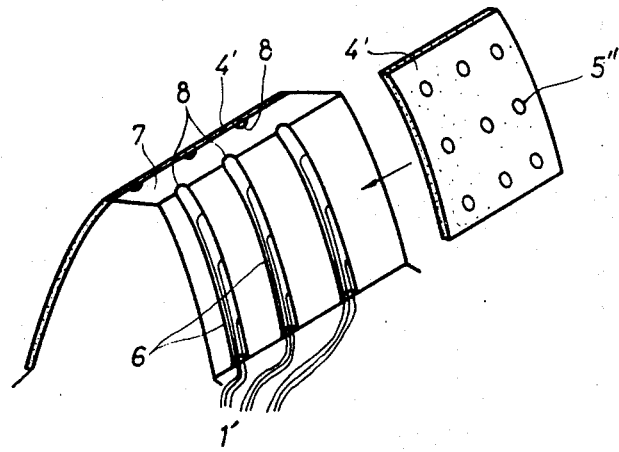

In still another embodiment illustrated in FIG. 6, the laminated master gear is made of steel. Several grooves 8 are cut along the tooth surface of the terminal tooth and conductive strips or wires 6 are embedded in these grooves 8. Detectors 5'' are formed as projections from an insulator plate 4'. The detectors 5'' and the conductors 6 are connected together and bonded to the surface of the terminal tooth. Then the surface of the terminal tooth is ground to its finished form.

Figure 7:
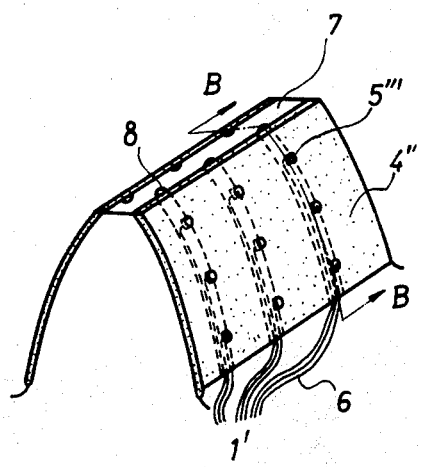
Figure 8:
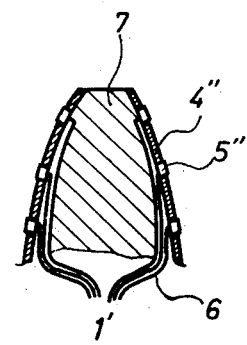
FIG. 8 is a sectional view taken along the line B—B of FIG. 7.

In still another embodiment illustrated in FIGS. 7 and 8, several grooves 8 are cut along the tooth surface of the terminal tooth in the same way as in the preceding example. Insulated conductors 6 are laid in these grooves, and detectors 5''' are connected to these conductors. The detectors project outward and synthetic resin 4'' is cast onto the surface of the terminal tooth, thereby constituting an insulating layer.

Figure 9:
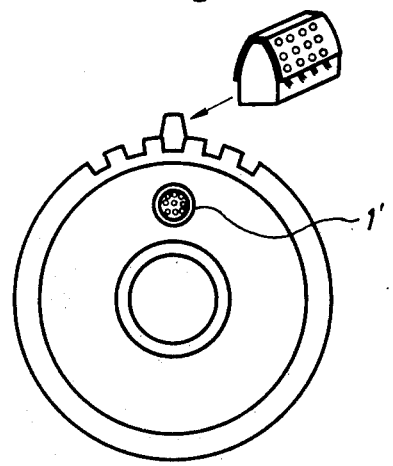
FIG. 9 is a schematic view of a master gear equipped with a contact detector according to one embodiment of the present invention.

A master gear may be produced by assembling each tooth, as shown in FIG. 9, in such a manner that each tooth is mounted in the appropriate position.

When the master gear of the present invention is used, contact can be checked in both directions $a$ and $b$. At the same time, adoption of the master gear according to the invention will be useful for work step control, guarantee high precision in mass production and accordingly assure the production of a gear with consistent accuracy of tooth face in the succeeding steps. When the method illustrated in the second embodiment is used, the spacing between the conductors (FIGS. 4, 5) can be made as small as 0.3 mm, and the laminated strip can be as thin as 0.5 mm, whereas the thickness of the conductive laminations is 1.5 mm and the thickness of the insulating layer is 1 mm in the case of the conventional laminated master gear. Thus the spacing of the inspecting terminals 5' can be reduced, thereby increasing the number of checkpoints and permitting a more precise checking of the tooth contact in both directions $a$ and $b$.

What is claimed is:

1. Master gear for checking tooth contact comprising:
    a. at least one terminal tooth,
    b. insulating layers provided on the contact surfaces of said terminal tooth, and
    c. a plurality of conductive detectors which are embedded at regular intervals in said insulating layers some of which extend in a direction parallel and others of which extend in a direction perpendicular to the flat sides of said tooth.

2. Master gear for checking tooth contact as claimed in claim 1, wherein said insulating layers consist of a plurality of narrow, laminated insulator strips arranged on said contact surfaces and said conductive detectors are bonded to said contact surfaces.

3. Master gear for checking tooth contact as claimed in claim 1, wherein said insulating layer consists of a single insulator plate upon which a plurality of conductive detectors are regularly arranged and extend in a direction parallel and a direction perpendicular to the flat sides of the tooth, the conductive detectors being bonded to the tooth surface.

4. Master gear for checking tooth contact as claimed in claim 1, wherein a plurality of conductive detectors are regularly arranged directly on the contact surface of the tooth and an insulating layer of synthetic resin is applied to said surface between said detectors.

5. Master gear for checking tooth contact as claimed in claim 1, wherein separately produced terminal teeth for checking tooth contact are embedded in the gear body.

* * * * *